(12) United States Patent
Seyfi et al.

(10) Patent No.: US 12,389,880 B2
(45) Date of Patent: Aug. 19, 2025

(54) REFRIGERATED SMART PET FEEDER

(71) Applicants: Ahmad Seyfi, Falls Church, VA (US); Leslie Bakeer, Silver Spring, MD (US)

(72) Inventors: Ahmad Seyfi, Falls Church, VA (US); Leslie Bakeer, Silver Spring, MD (US)

(73) Assignee: Happy Llama, LLC, Silver Spring, MD (US)

(*) Notice: Subject to any disclaimer, the term of this patent is extended or adjusted under 35 U.S.C. 154(b) by 209 days.

(21) Appl. No.: 18/381,958

(22) Filed: Oct. 19, 2023

(65) Prior Publication Data
US 2024/0268342 A1 Aug. 15, 2024

Related U.S. Application Data

(60) Provisional application No. 63/419,152, filed on Oct. 25, 2022.

(51) Int. Cl.
*A01K 5/02* (2006.01)
*F25B 21/04* (2006.01)

(52) U.S. Cl.
CPC ............ *A01K 5/0291* (2013.01); *F25B 21/04* (2013.01)

(58) Field of Classification Search
CPC ...... A01K 5/0275; A01K 5/0291; F25B 21/04
See application file for complete search history.

(56) References Cited

U.S. PATENT DOCUMENTS

| | | | | |
|---|---|---|---|---|
| 2,528,742 A * | 11/1950 | Coffing | ............... | A01K 5/0114 119/51.5 |
| 4,248,175 A * | 2/1981 | Navarro | ............... | A01K 5/0114 119/51.12 |
| 4,421,059 A * | 12/1983 | Cousino | ............... | A01K 5/0291 119/51.12 |
| 4,617,874 A * | 10/1986 | Zammarano | ......... | A01K 5/0291 119/51.12 |
| 5,176,103 A * | 1/1993 | Reid | ................... | A01K 5/0291 119/51.13 |
| 6,349,671 B1 * | 2/2002 | Lewis | ................... | A01K 5/025 119/51.02 |
| 6,766,766 B1 * | 7/2004 | Elliott | ................. | A01K 1/0107 119/57.92 |
| 7,650,855 B2 * | 1/2010 | Krishnamurthy | .... | A01K 5/0291 119/51.11 |
| 8,800,488 B2 * | 8/2014 | Stone | ................... | A01K 5/0114 119/51.01 |
| 10,568,301 B2 * | 2/2020 | Chen | ................... | A01K 5/0291 |
| 12,310,338 B2 * | 5/2025 | Franklin | .............. | A01K 5/0291 |
| 2005/0066905 A1 * | 3/2005 | Morosin | ............. | A01K 5/0291 119/51.02 |
| 2021/0144960 A1 * | 5/2021 | Taneja | ................... | A01K 7/027 |

* cited by examiner

Primary Examiner — Peter M Poon
Assistant Examiner — Marisa V Conlon
(74) Attorney, Agent, or Firm — Larisa Migachyov

(57) ABSTRACT

A refrigerated pet feeder that stores multiple portions of perishable food, cooled by a cooled plate. The cooled plate comprises a cutout so that the portion of perishable food currently offered can warm up to ambient temperature. In an embodiment, a heating element under the currently offered portion of food can warm it up to ambient or above-ambient temperature as needed by the pet.

21 Claims, 13 Drawing Sheets

Fig. 9    Heating System Assembly (Exploded View)

Fig. 10    Heating System Assembly

Hollow Areas are Filled with Insulated Matrial

REFRIGERATED SMART PET FEEDER

CROSS-REFERENCE TO RELATED APPLICATIONS

The present application takes priority from App. No. 63/419,152, filed Oct. 25, 2022, which is herein incorporated by reference.

BACKGROUND

Field of the Invention

The present invention relates generally to automated pet feeders for house pets, and more specifically to automated pet feeders that provide refrigeration for perishable food while still delivering that perishable food to the pet at a higher temperature

Background of the Invention

Dogs and cats are very popular pets, and 70% of households in the United States have at least one pet. While pets provide a great deal of enjoyment and emotional support to their owners, one problem associated with owning a pet is how to take care of them while the owner is not home. While dogs require regular walks and a lot of human attention, cats typically can easily tolerate a few days of being left alone in the house, as long as food and water is provided. Cats are highly territorial animals and prefer being at home in familiar territory to being in a boarding facility surrounded by unfamiliar animals. Furthermore, 27% of pet owners in the US are baby boomers who are at an age prone to strength deficit, and may have difficulty handling the pet-feeding task every day. Because of this, many cat owners acquire automated pet feeders to feed the cat regular food portions over several days while the owner is away or unable to feed the pet for other reasons. Typically, such devices are filled with multiple portions of non-perishable dry food and are configured in such a way as to deliver portions of food to the pet at regular intervals.

One problem associated with such pet feeders is how to provide the pet with perishable food that requires refrigeration, since that kind of food is healthier for the pet; for some health-compromised pets, perishable food may be the only option available. Some prior art exists in this area; in some cases, ice packs are used to cool down the food, and some prior art devices use heat pumps to blow cold air over the food. This results in condensation, which is messy if left unattended over several days, and causes an increased evaporation rate of moisture from the food and more condensation in the feeder, requiring a drainage system to drain the water. Ice packs also require regular attention to replace them, and don't keep the food at the right temperature. Also, cats are very sensitive to the temperature of the wet food they are given, and do not want to eat it if it is too cold.

A need exists for a pet feeder that provides a pet with perishable food that is kept refrigerated until it is offered to the pet, and that avoids excessive condensation and moisture loss from the food. A need also exists for a pet feeder that provides a pet with perishable food at an acceptable temperature for multiple days.

SUMMARY OF THE INVENTION

An object of the present invention is to provide an automated pet feeder that supplies a pet with perishable food for multiple days in a row without spoilage.

Another object of the present invention is to provide an automated pet feeder that supplies a pet with perishable food at the right temperature for the pet.

Another object of the present invention is to provide an automated pet feeder that keeps perishable food refrigerated for multiple days until it is ready for consumption, without causing excessive condensation and moisture loss from the food.

The refrigerated pet feeder of the present invention comprises a rotating tray comprising multiple food bowls, a housing covering the rotating tray, where the housing has an opening for one of the food bowls, a motor to rotate the tray, and a cooled plate located under the rotating tray and in thermal contact with the food bowls. The cooled plate has a cutout under one of the bowls, which is the bowl that is currently dispensed to the pet; this ensures that the food that is served to the pet is not too cold. The cooled plate is cooled by a Peltier cooling element, which comprises a hot side and a cold side; the cold side is connected to the cooling plate. The hot side of the Peltier cooling element is cooled by a separate cooling device, such as a fan or a water cooling system.

In an embodiment, the Peltier cooling element is located on the underside of the cooled plate, while the bowls are located above it.

In an embodiment, there is a heater located within the cutout under the currently dispensed bowl. The heater may be a separate heater or may be the hot side of the Peltier cooling element.

In an embodiment, the cooled plate is made of aluminum. It may also be made of copper, steel, stainless steel, thermally conductive polymers, or ceramic. In an embodiment, the cooled plate is approximately 6 mm thick. The cooled plate may also comprise a low-friction thermally conductive coating applied to its top side, so that the bowls slide easier. The cooled plate preferably has a uniform temperature, with any temperature difference between its hottest point and its coldest point less than 10° C.

The hot side of the Peltier heating element is cooled down by cooling device, such as a fan or a water-cooling system. There may be a heat sink connected to it to make cooling it more efficient.

In an embodiment, the cooling device cools down the hot side of the Peltier heating element to approximately 30° C.

Each of the food bowls may have a bottom side made out of conductive material to make refrigeration of the food easier. In an embodiment, there may be thermally insulative material placed between the food bowls. The food bowls may all be made of one piece of material, or may be separate bowls connected to the axis of rotation using a pin.

The pet feeder of the present invention may also comprise a processor and memory and a communication interface. That may make it possible to control the pet feeder remotely via a smartphone or similar device. The pet feeder may also comprise at least one digital scale to measure the weight of the food, or at least one depth sensor to measure the volume of the food.

In an embodiment, the pet feeder also comprises an audible or visible alert, such as a blue light.

LIST OF FIGURES

DETAILED DESCRIPTION

Figure 1:
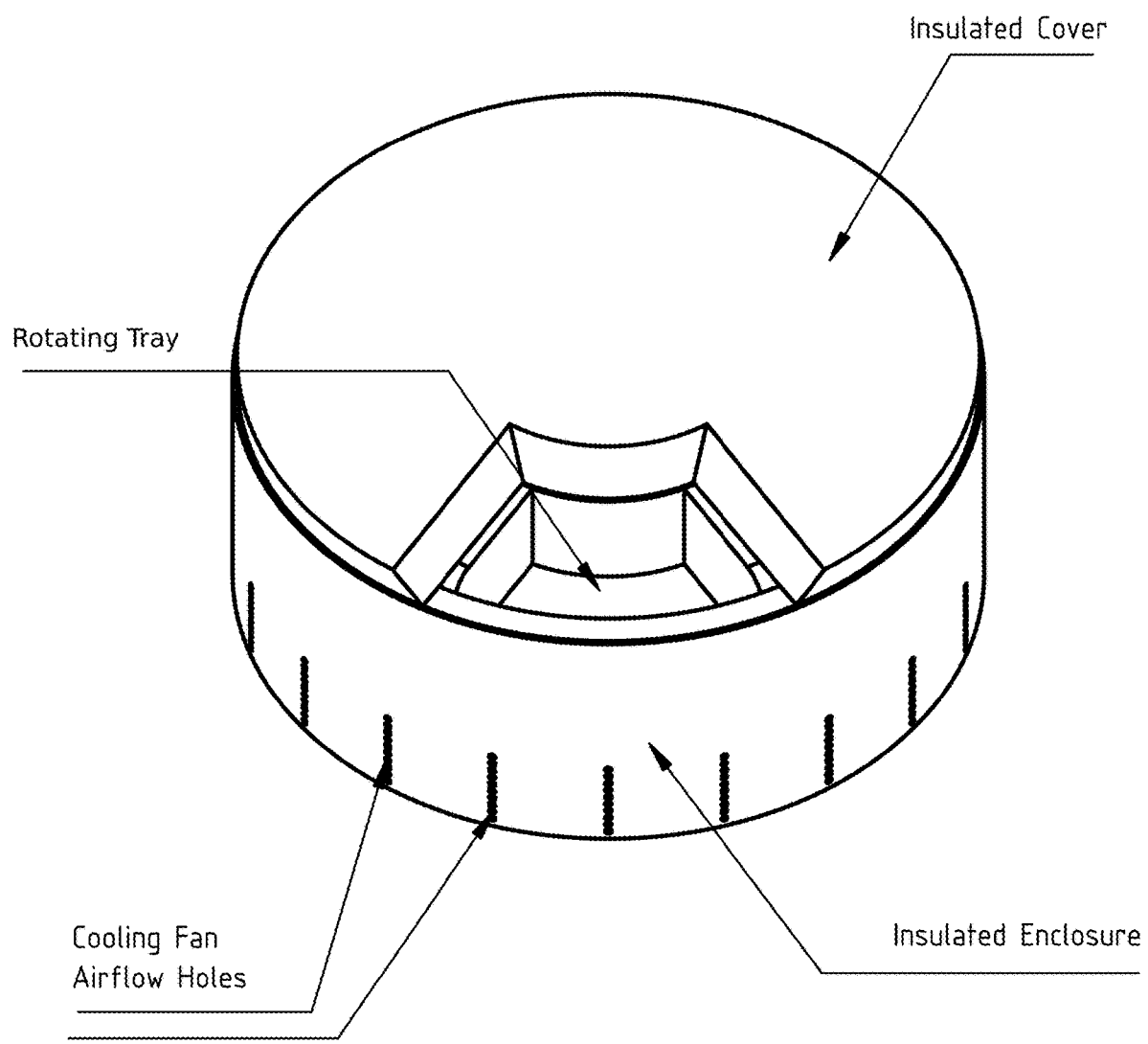
FIG. 1 shows an embodiment of the present invention in the fully assembled state.

An embodiment of the present invention is shown in FIG. 1. The pet feeder of the present invention comprises a rotating tray covered with an insulated cover. The rotating tray comprises multiple food bowls in which perishable food may be stored; preferably, the food bowls are sized appropriately to provide one serving of food to the pet. The insulated cover comprises an opening over one of the food bowls so that the pet can only access one serving of food at a time. The insulated cover is preferably strong enough that a pet cannot damage it or break through it, and preferably is a thermal insulator that can keep the other portions of food refrigerated. The insulated areas may be made of a single material or layers of different materials; for example, a Styrofoam material enclosed in a plastic shell. The rotating tray is free to rotate around its axis so that a different food bowl is presented to the pet at regular intervals, at scheduled times, or on demand. The insulated enclosure covers the sides of the pet feeder to prevent the pet from accessing it and to maintain the proper temperature of the food; airflow holes provide ventilation for the cooling fan located on the underside of the pet feeder. The lower compartment of the device that houses the refrigeration system and the cooling fan is warmer than the cooled food compartment. In an embodiment, an insulation material is also used to minimize unintended heat transfer between the upper and lower compartments.

Figure 2:
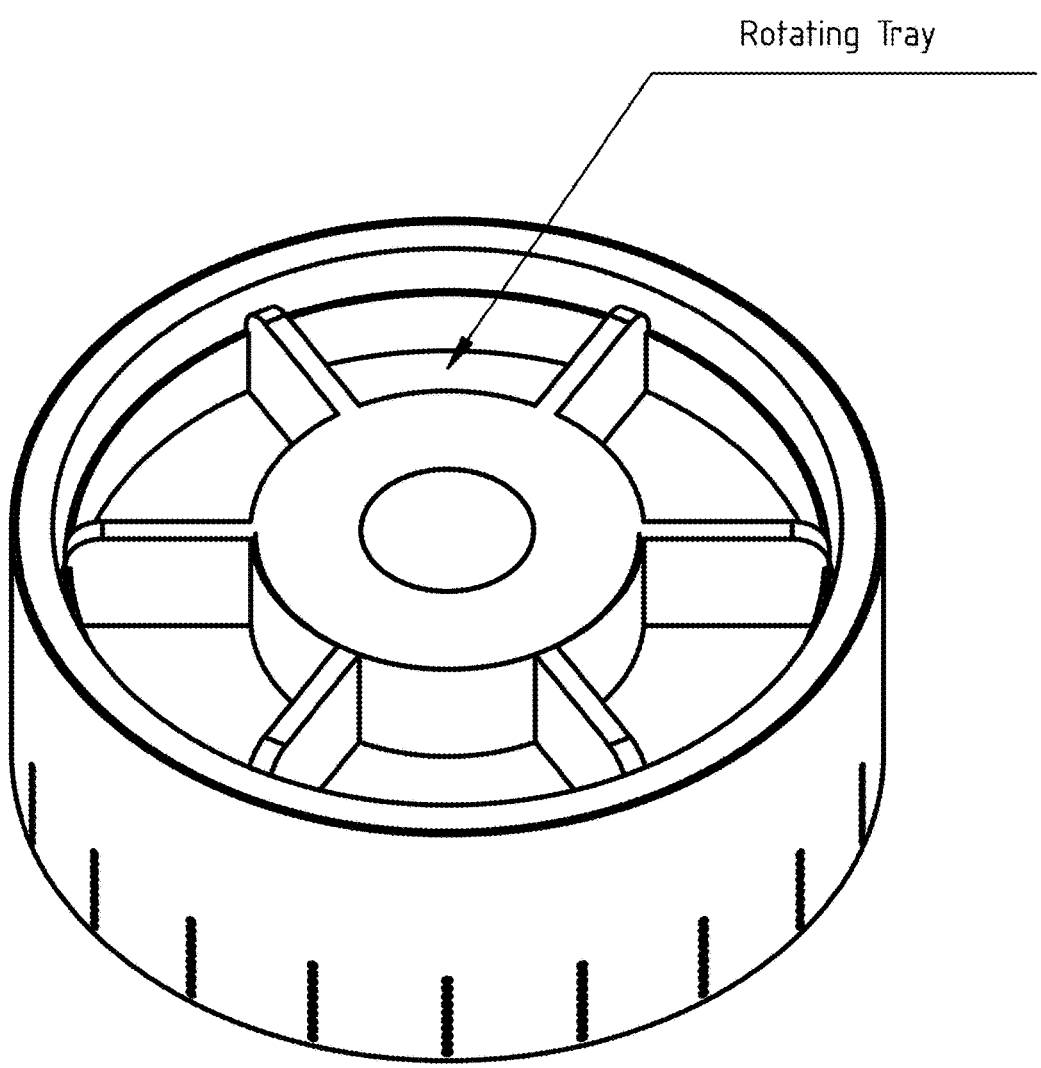
FIG. 2 shows an embodiment of the present invention with the cover off.

FIG. 2 shows an embodiment of the present invention with the insulated cover taken off. As shown, the rotating tray comprises multiple food bowls. While the Figure shows six food bowls, any other number of food bowls may also be included in the present invention. Furthermore, while the Figure shows the food bowls shaped like sectors, they can also be any other shape, including round or rectangular, and may have rounded corners to make it easier for the pet to get at the food. The bottom side of each food bowl is preferably flat. In an embodiment, each food bowl is made of plastic or any other food safe material; in an embodiment, each food bowl is made of a thermally conductive material to make refrigeration of the food more efficient. In an alternate embodiment, the bottom side of each food bowl is made of a thermally conductive material (or comprises a thermally conductive material) while the sides that separate the food bowls are made out of a thermally insulative material, or comprise a thermally insulative material such as Styrofoam. This enables each portion of food to be cooled by the cooling plate, while allowing the currently offered food bowl to warm up to ambient temperature. In an alternate embodiment, the entire tray is made of the same material.

One of the advantages of using a rotating tray is that the location of the dispensed food bowl is fixed. This enables the pet to easily access each food bowl. In designs that use a static tray and a rotating cover, when the machine is placed near a wall, at least one of the bowls may be difficult for the pet to reach. This can cause many problems, including the inability for the pet to access the food, improper digestion or whisker stress due to improper feeding position, and increased potential for injury or machine malfunction because the location of the tray could encourage the animal to walk on the machine to access the bowl. A rotating tray eliminates all those problems.

The rotating tray is connected to a motor and a controller that enables it to rotate in such a way that a new bowl of food is presented to the pet at regular intervals, at scheduled times, or on demand. In an embodiment, the controller is connected to a communication interface that enables it to communicate with a mobile device directly or indirectly using a WiFi hub, or remotely via a cloud service, either to receive control signals from it or to send data to it.

Figure 3:
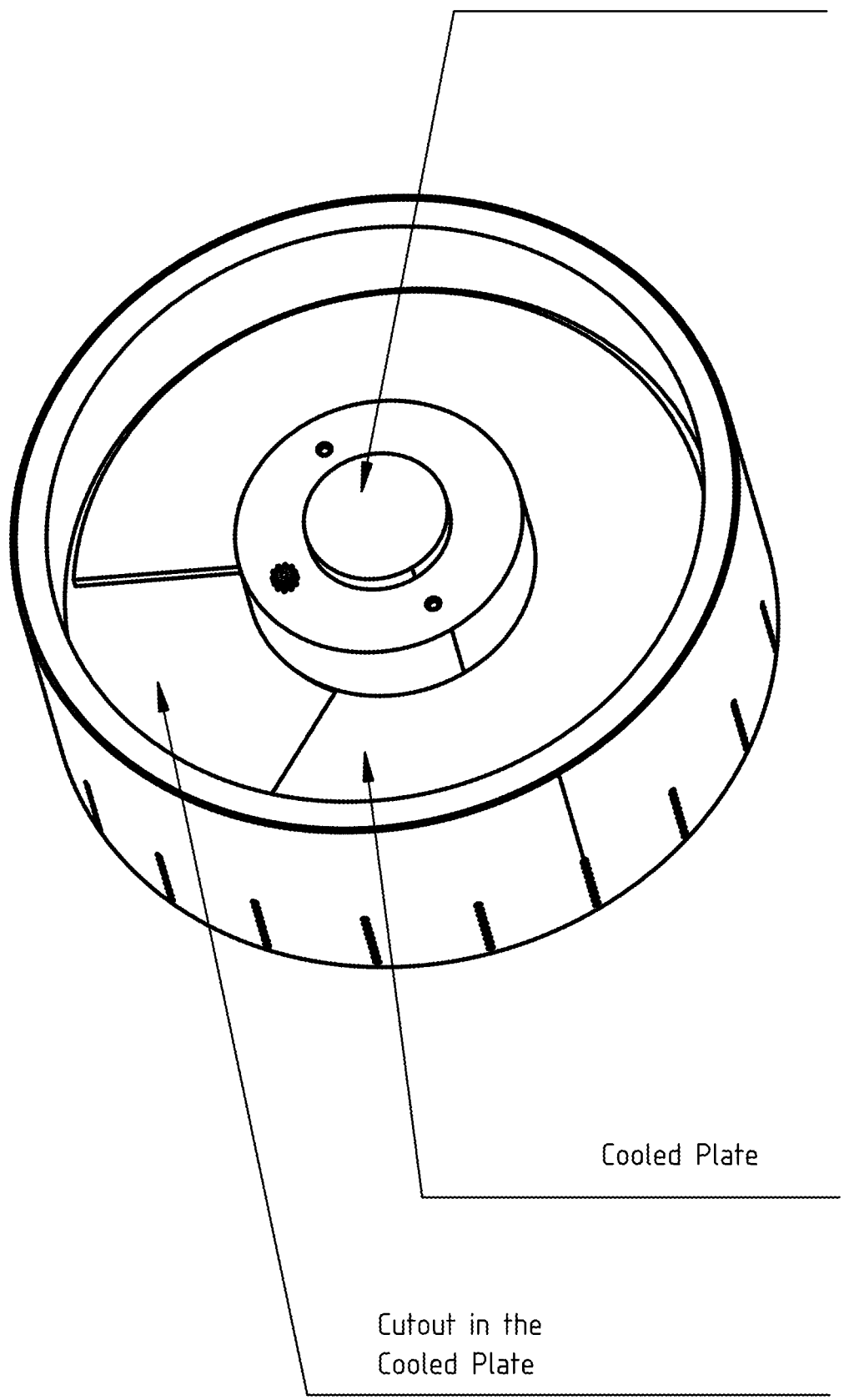
FIG. 3 shows an embodiment of the present invention with the cover and the tray taken off.

As shown in FIG. 3, there is a cooled plate located under the rotating tray. In one embodiment, the cooled plate is in thermal contact with the rotating tray to increase refrigeration efficiency; in an alternate embodiment the tray is placed close to the plate without direct contact. In this case, the cooled plate needs to be kept at a lower temperature to compensate for temperature drop across the air filled gap. In another embodiment, the gap between the bowl and the plate may be filled with water or other liquid with a thermal conductivity higher than thermal conductivity of air to improve efficiency. The cooled plate is kept at a temperature that enables it to cool the bowls of food to a safe temperature to enable multi-day storage of the food portions. The thickness of the cooled plate is sufficient to keep the cooled plate at a uniform temperature. Such a uniform temperature eliminates the need for the thermoelectric element to operate at temperatures much lower than the required food temperature, and helps with efficiency and cooling power of the thermoelectric device. In the preferred embodiment, the cooled plate has enough thermal mass to maintain a temperature difference of less than $10°$ ° C. between its coldest and hottest point. In an embodiment, the cooled plate is 6 mm thick and made of aluminum, though other thicknesses and materials are also included in the present invention as long as the plate can maintain a uniform temperature throughout its area. In an embodiment, the cooled plate can lower the food temperature below $4°$ C. while the plate itself stays above freezing. This means that there is almost no ice buildup. Since ice buildup can lower the efficiency of a cooling system, the lack of ice buildup will improve the thermal efficiency and mechanical reliability of the device.

The cooled plate is preferably made of aluminum, but may also be made of copper, steel, stainless steel, thermally conductive polymers (TCP), ceramic, or any other thermally conductive material. The cooled plate does not rotate along with the tray, but rather is kept stationary while the tray rotates. In an embodiment, the cooled plate comprises a low-friction thermally conductive coating to enable the tray to slide along it as it rotates; this improves the efficiency of the rotation mechanism and the longevity of the device. For example, ceramic or PTFE may be used for this purpose. Since only one cooled plate is used, this simplifies the design of the present invention and reduces its complexity and energy use. Furthermore, because conductive heat transfer is used, this reduces the amount of cold air circulating in the pet feeder, which reduces the amount of condensation and eliminates the need for a drainage tray. Furthermore, because there is no airflow, food moisture can be maintained more effectively; moisture content in pet food is essential for a healthy diet and for reducing the risk of infection and illness.

In an alternate embodiment, the tray may be placed at a short distance from the plate, but not in direct contact with it. The gap between the tray and the cooled plate is filled with a thin layer of air; while air does not have good thermal conductivity, a thin layer of air does not affect the efficiency significantly. In another embodiment, the gap between the tray and the plate is filled with water or other thermally conductive liquid.

As shown in FIG. 3, the cooled plate comprises a cutout of approximately the same size and shape as one of the bowls within the tray, wherein the cutout is located at the same position as the opening in the insulated cover. In an alternate embodiment, the shape of the cutout may not match the shape of the bowl. This enables the food bowl currently offered to the pet to not be too cold. In an embodiment, the opening in the insulated cover comprises a sliding cover, and the cover is not opened until a predetermined amount of time has passed, so that the food is not offered to the pet until it has had time to warm up closer to ambient temperature. In another embodiment, the sliding cover is not opened until the food has reached a certain temperature as measured by a temperature sensor located within the bowl or in thermal contact with the bowl.

Figure 8:
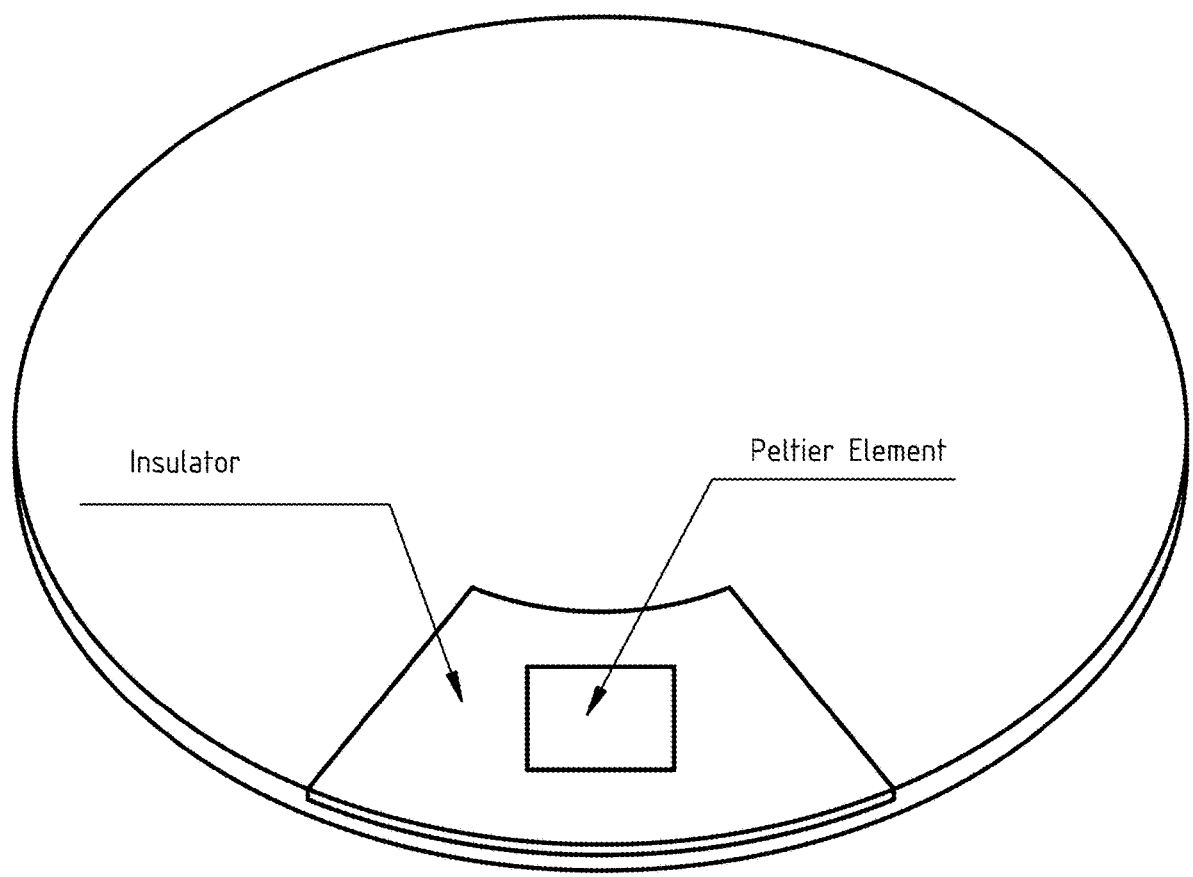
FIG. 8 and FIG. 9 show a view of the heating assembly using a Peltier element that is in contact with the bowl from top and in contact with the cooled plate from underneath.
Figure 9:
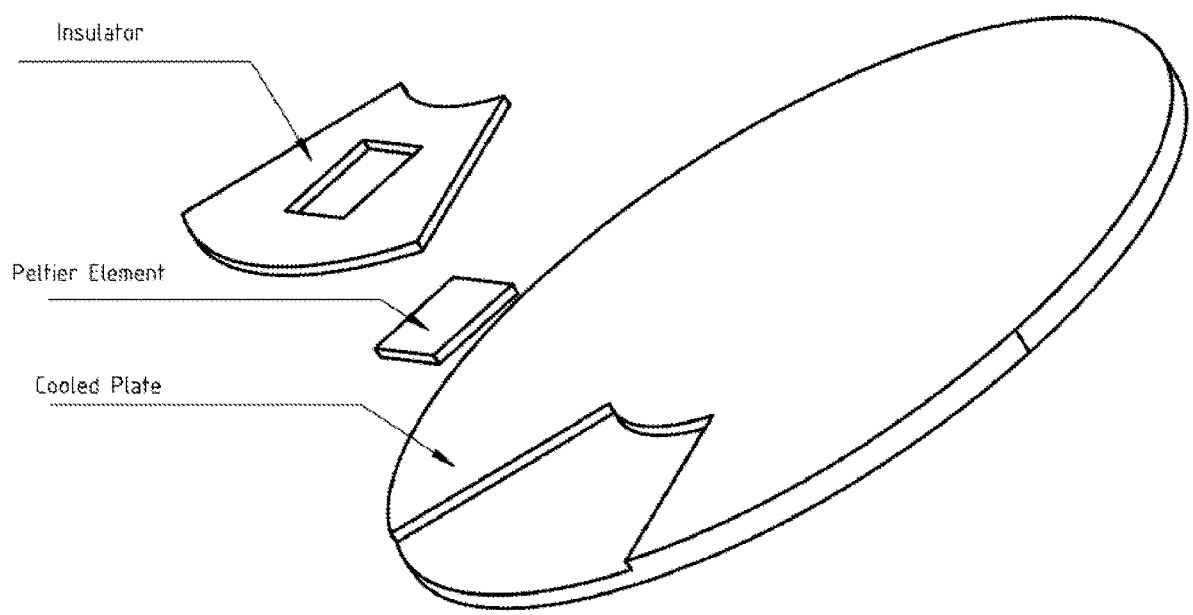
Figure 10:
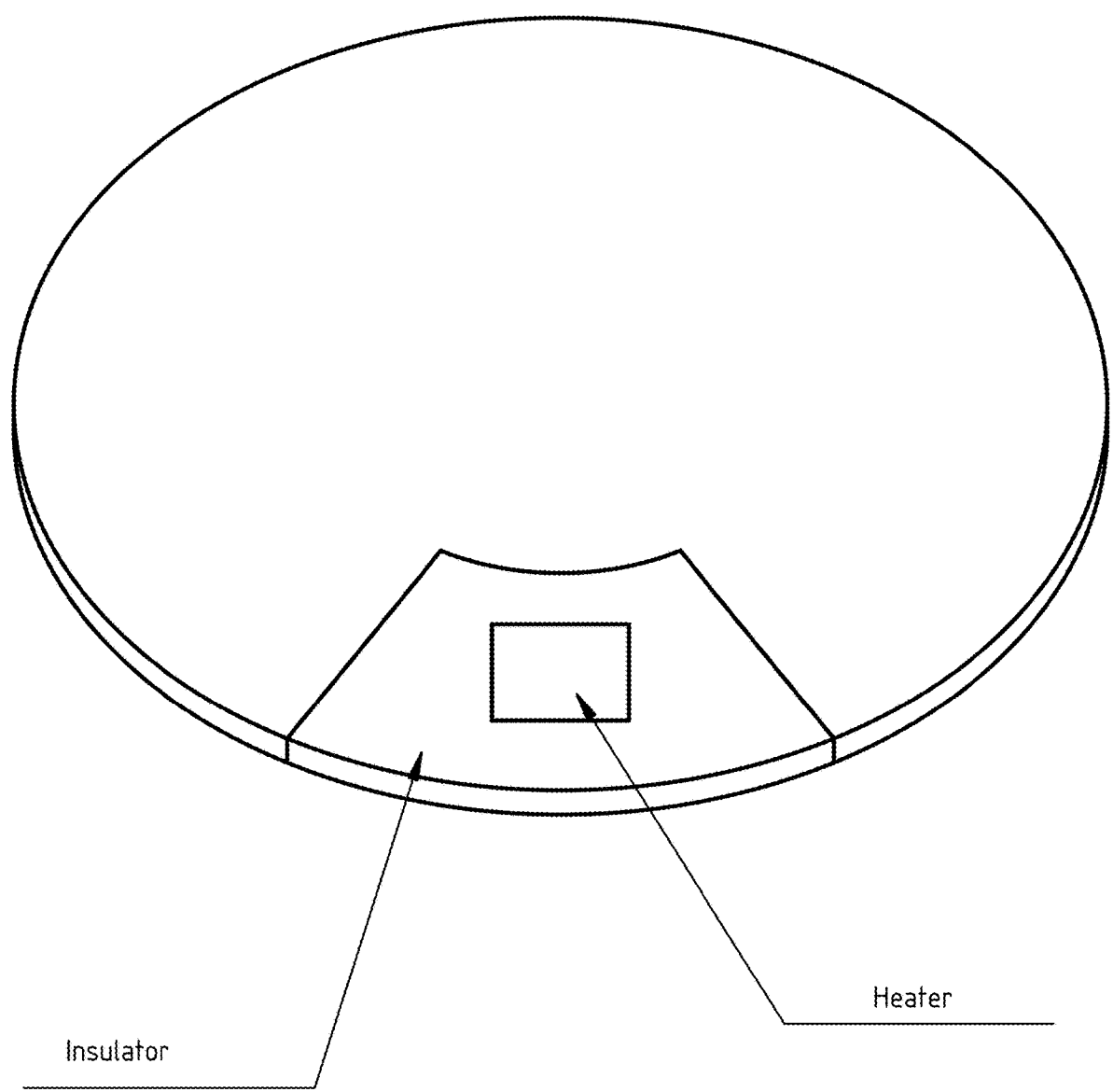
FIG. 10 shows a view of the heating assembly using a heating element that is insulated from the cooled plate.

In an alternate embodiment, as shown in FIGS. 8, 9, and 10, the cutout in the cooled plate is filled in by a heating element located under the food bowl currently offered to the pet. This enables the pet feeder to warm up the dispensed food faster, or to heat it to a higher temperature. In this embodiment, a thermometer may also be used to ensure the food reaches a predetermined temperature before it is offered to the pet. Since cats strongly prefer food warmed up to about 35-40° C., the heating element may be set to heat food to that temperature, or to any other temperature preference. The heating element is preferably a Peltier element mounted in a way that the hot surface is in direct contact with the bowl and the cold surface is in direct contact with the machine body (this eliminates the need for adding an insulator between the heating element and the feeder body). The heating element may also be any other heating element capable of heating up a portion of pet food as disclosed in the present application. The heating element is preferably thermally insulated from the cooled plate to prevent excess energy waste.

In another embodiment, instead of a cutout under the currently dispensed bowl, the cooled plate has an extruded section to house the Peltier element. This way, the cold side of the Peltier element can be mounted directly on the cooled plate while the heated upper side of the Peltier element is even with the rest of the cooled plate. This means that the rotation of the bowl is not interrupted, and the cold side of the Peltier heating element can be used to help cool down the cooled plate.

Figure 4:
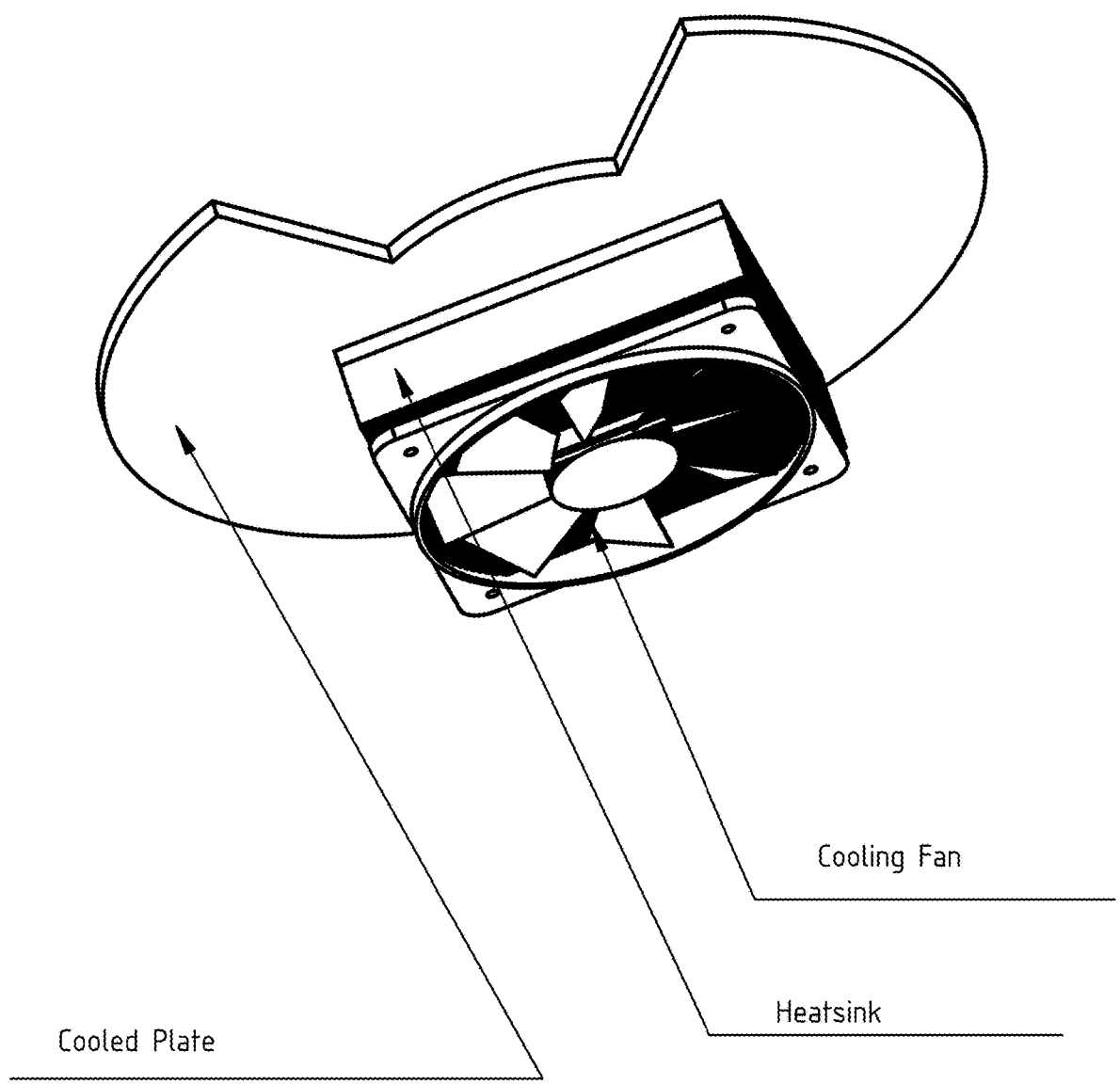
FIG. 4 shows an embodiment of the cooling system assembly of the present invention.
Figure 5:
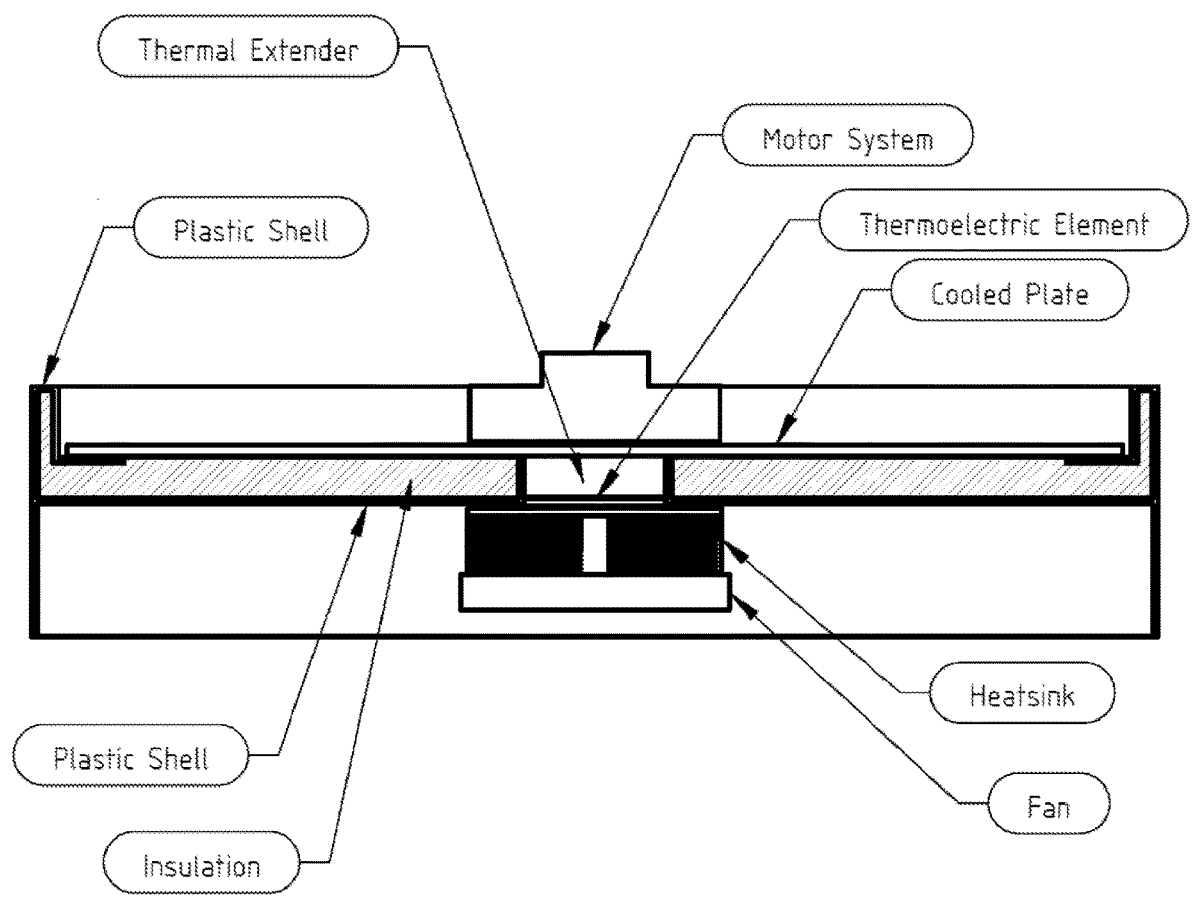
FIG. 5 shows a side view of an embodiment of the cooling system assembly of the present invention.

FIG. 4 shows the underside of the cooling assembly of an embodiment of the present invention. The Peltier element is thermally connected to the cooled plate to one side and connected to the heat sink from the other side. In an embodiment, a thermal extender (preferably on the cold side of the Peltier element) is used to create enough space between the cooled plate and the heatsink to allow for inserting insulation between the cooled plate and the heatsink, as shown in FIG. 5. One side of the thermal extender is connected to the cooled plate and the other side is connected to the thermoelectric element. Since a Peltier element is used, if there is ice buildup in the machine, an auto-defrost mechanism can be included in an embodiment of the present invention—the system can lower the power of the thermoelectric element to increase the temperature of the plate to slightly higher than freezing temperature and let the ice slowly melt down, or reverse the polarity of the thermoelectric elements and warm up the cooled plate to melt the ice faster.

Because the efficiency of thermoelectric elements is low, they produce a high amount of heat. The excess heat may damage the device. Thus, a cooling system is needed to cool down the hot surface of the thermoelectric element to keep it at its recommended operating temperature. Also, a thermoelectric element can only create a certain temperature difference between its hot and cold surfaces; thus, cooling down the hot surface results in a colder cold surface. For example, if a thermoelectric element can create a maximum temperature difference of 40° C. and the cold side is required to operate at −2° C., the hot side temperature should not exceed 38° ° C. Thus, a cooling system is needed to cool down the hot side. The cooling system may be a fan, as shown, or may be a water-cooling system, or any other system or device capable of providing cooling. In the preferred embodiment of the present invention, the hot surface should be cooled to approximately 30 C.

Figure 6:
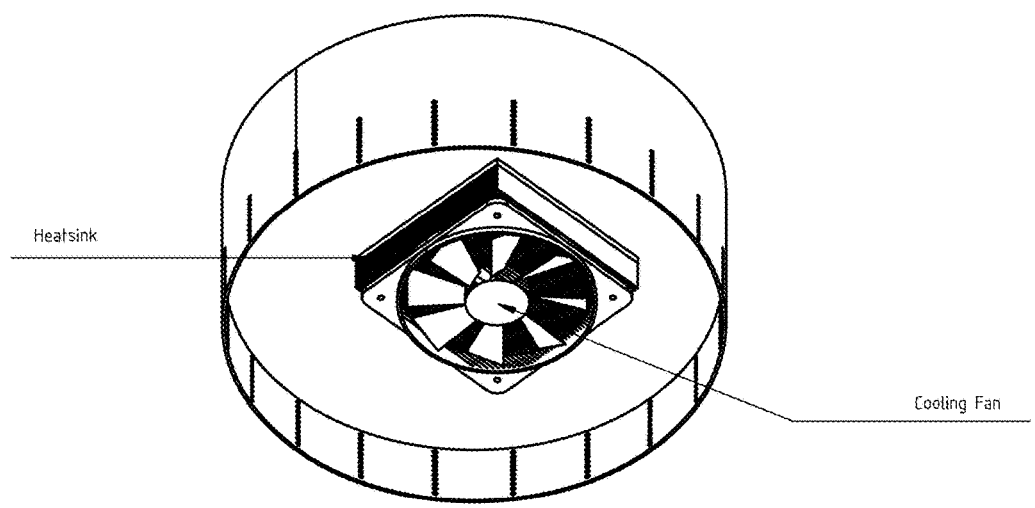
FIG. 6 shows a bottom view of the present invention.

FIG. 6 shows the underside of an embodiment of the pet feeder of the present invention in its assembled state. As can be seen, the cooling fan is located on the underside of the cooling plate. The enclosure comprises narrow cutouts to provide ventilation. The cutouts are preferably narrow enough to prevent a pet from accessing the fan, while also large enough to provide enough ventilation for the fan. In an embodiment, mesh openings are used for this purpose; in alternate embodiments, other patterns of holes or openings are used for this purpose. In an alternate embodiment, other means of cooling and heat exchange may be employed to cool down the hot surface of the thermoelectric element.

Figure 7:
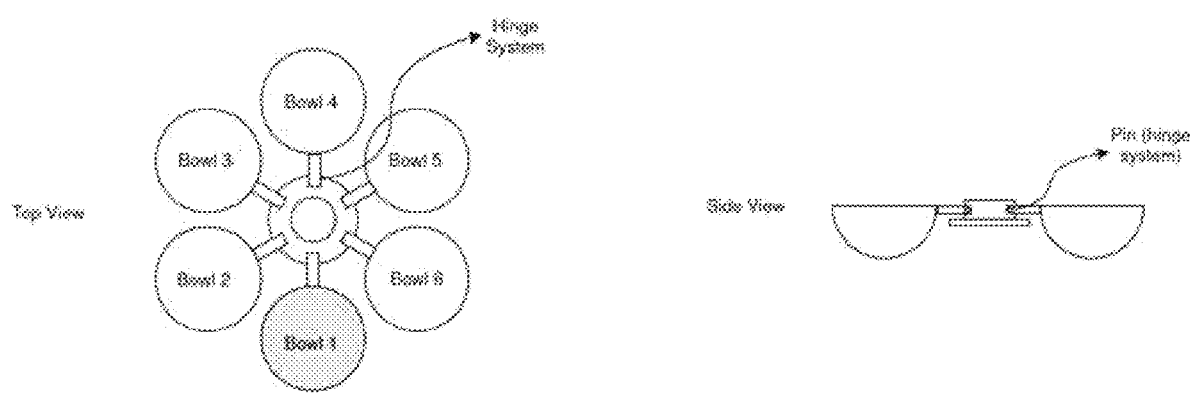
FIG. 7 shows a view of an alternate embodiment of the present invention.

FIG. 7 shows an alternate embodiment of the bowls, where a tray is not used. While a tray is a simpler design, it requires accurate manufacturing to make sure that it is completely flat on the bottom and that all the bowls have thermal contact with the cooling plate at the same time, even as the tray rotates. In an embodiment, this design is modified by replacing a rigid tray with multiple bowls that are attached to the rotating assembly using pins as shown. This design compensates for manufacturing inaccuracies and enables better cooling of the food.

Figure 11:
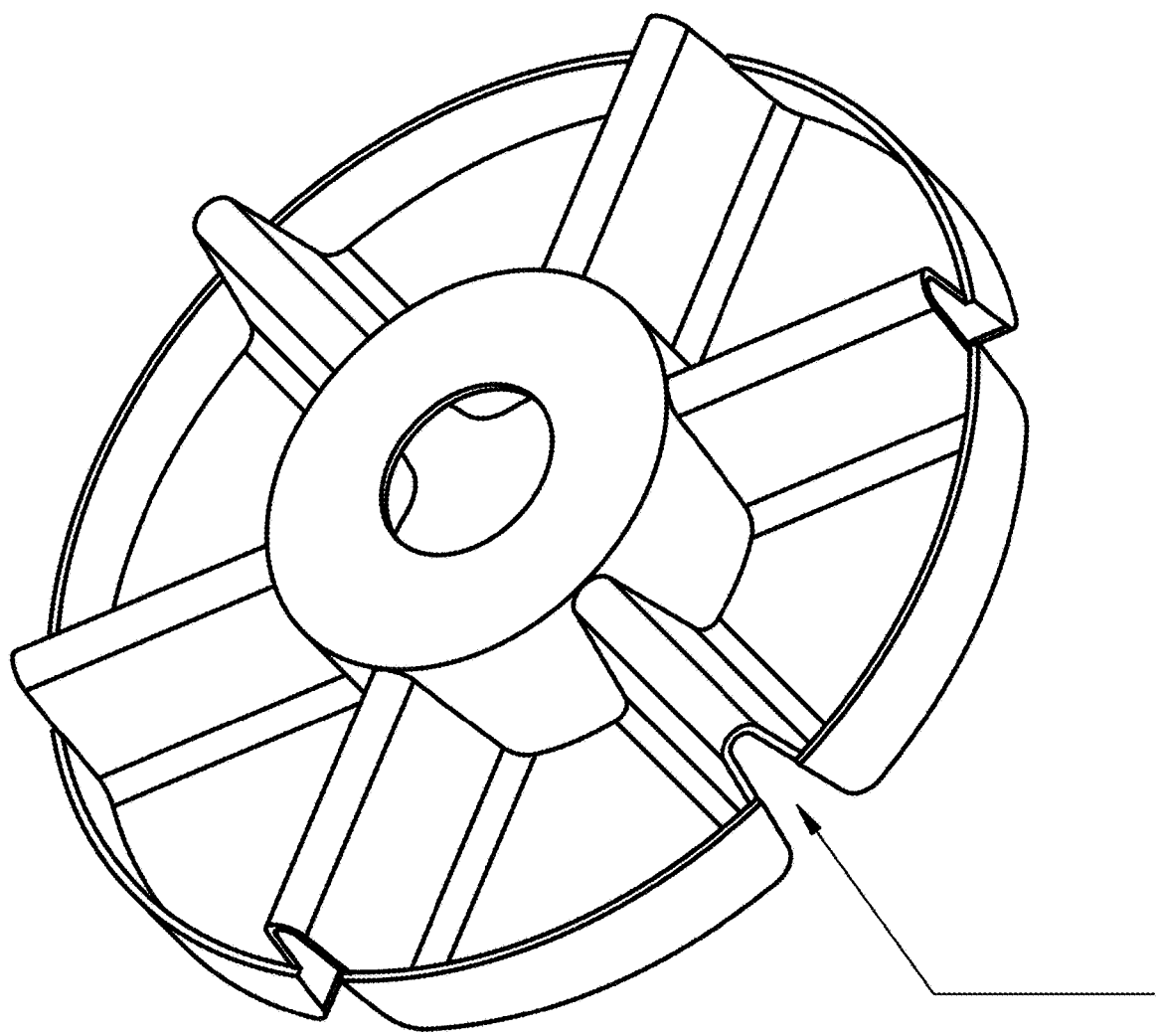
FIG. 11 shows how bowls are insulated from each other by injecting insulator material in hollow areas of the bowl.

FIG. 11 shows an embodiment of the tray that is easier to manufacture and allows for better insulation between the bowls. The tray is formed out of one solid sheet of thin plastic material; the hollow areas between the bowls are filled with insulated material to prevent the currently dispensed bowl from warming up the other cold bowls.

Figure 12:
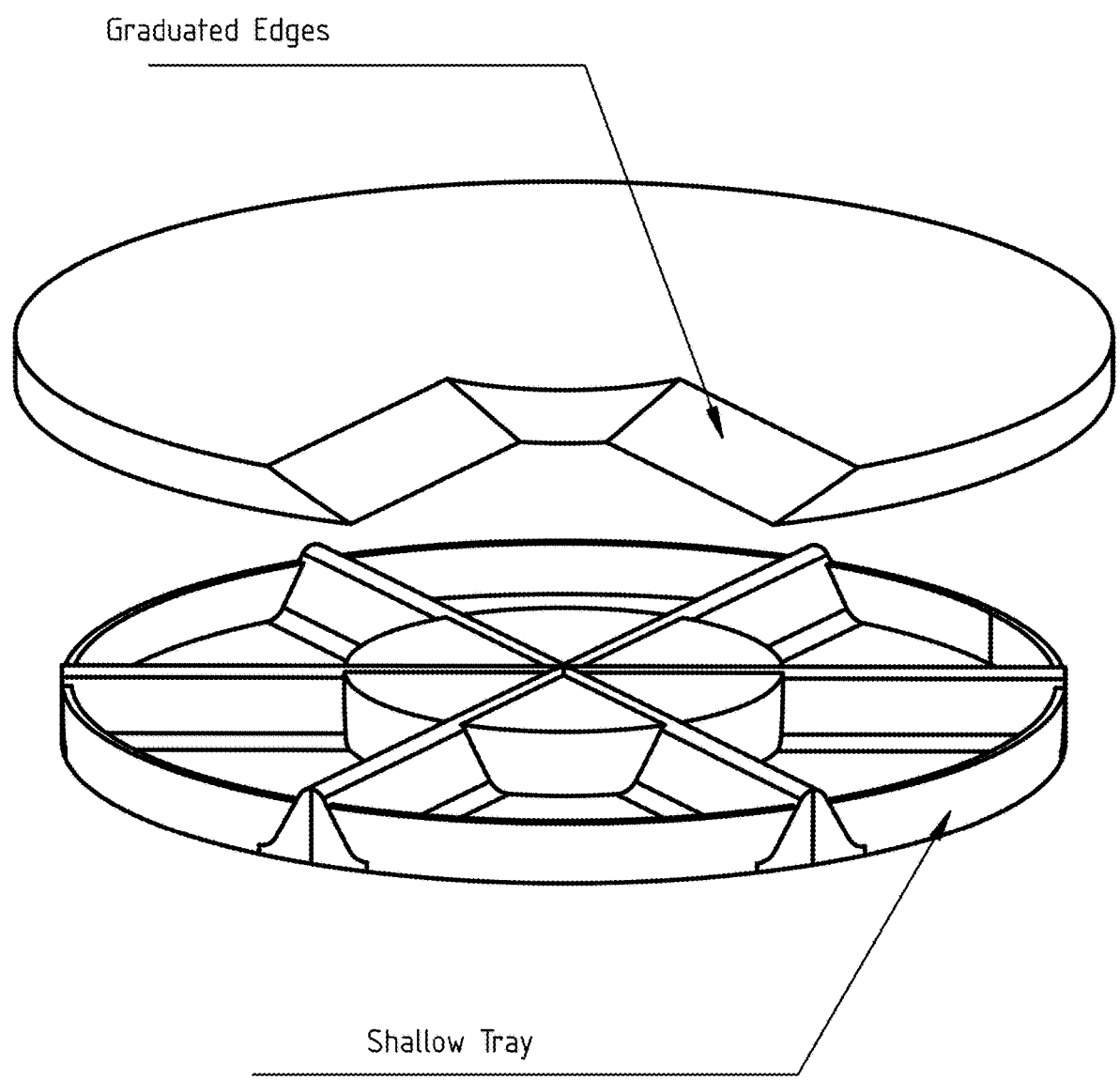
FIG. 12 shows graduated edges to reduce whisker fatigue.

In an embodiment, the tray and the bowls are shallow and the edges of the cutout in the lid are graduated, as shown in FIG. 12. This prevents whisker fatigue in cats and ensures greater comfort for the animal.

Figure 13:
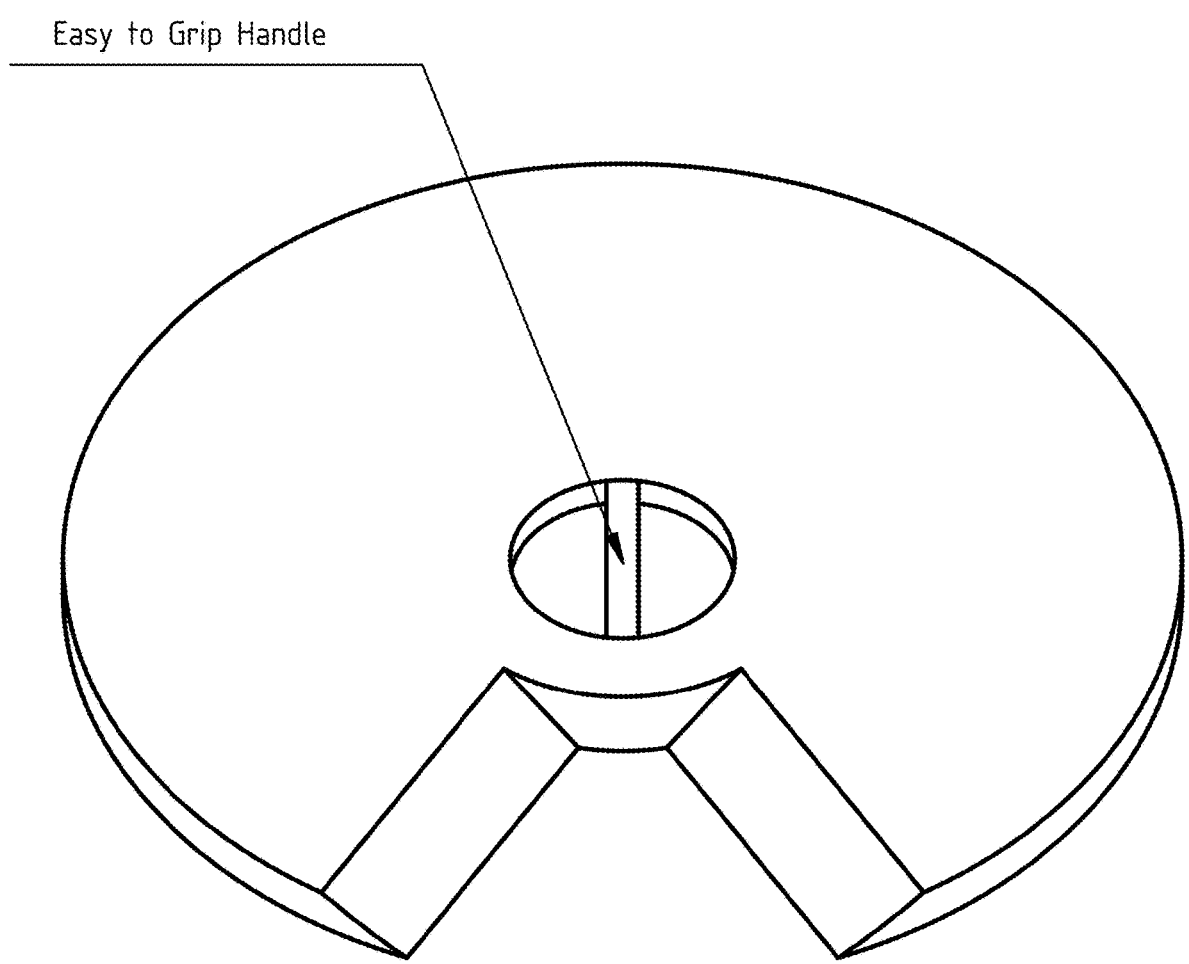
FIG. 13 shows a modification that allows greater accessibility for pet owners with strength deficit.

In an embodiment shown in FIG. 13, the lid comprises a handle that is easy to grip, to enable a pet owner with physical challenges to refill the feeder more easily.

In an embodiment, the bowls and pins are connected to a digital scale (for example, a load cell) to measure the weight of the dispensed bowl before and after food consumption. This enables the device to collect information on the weight of the dispensed and consumed food. In an embodiment, a depth sensor (for example, a time of flight sensor) is used to measure the volume of the dispensed and consumed food. The information can then be stored on the device or sent to the pet owner as raw data or processed data that informs the owner about trends or even associate the data with pet health metrics.

In an embodiment, the pet feeder of the present invention comprises an alert to let the animal know that it is time to eat. The alert can be an audible alert, such as a beep or a recording of the owner's voice; or a visible alert, such as a blinking light. In an embodiment, the blinking light is blue, since that is highly visible to both cats and dogs. A visible alert can be helpful for pets who are hearing-impaired; many white cats are deaf, for example.

In an embodiment, the pet feeder of the present invention is connected to a network, such as the Internet or a home network. This enables it to connect to the pet owner's phone and send and receive information from it. For example, a pet owner can trigger food dispensation on demand or set the food dispensation schedule using a phone app. In other embodiments, the pet feeder can send a notification to the user when food is dispensed, when only a preset number of food portions are left, or in the case of any failure of the device.

Exemplary embodiments of the present invention are described above. It is to be understood that the present invention encompasses other embodiments that are reasonable equivalents to the elements described in the above disclosure.

The invention claimed is:

1. A refrigerated pet feeder, comprising:
   a rotating tray comprising multiple food bowls;
   a housing covering the rotating tray, wherein the housing comprises an opening approximately the same size and shape as one of the food bowls;
   a motor for rotating the rotating tray;
   a cooled plate located under the rotating tray and in thermal contact with the food bowls, wherein the cooled plate comprises a cutout, wherein the cutout is at least as large as one of the food bowls;
   a Peltier cooling element comprising a cold side and hot side, wherein the cold side of the Peltier heating element is thermally connected to the cooled plate;
   a cooling device located in such a way as to cool the hot side of the Peltier cooling element.

2. The refrigerated pet feeder of claim 1, wherein the cooled plate comprises a top side and a bottom side, wherein the food bowls are in thermal contact with the top side of the cooled plate, wherein the Peltier cooling element is in thermal contact with the bottom side of the cooled plate.

3. The refrigerated pet feeder of claim 1, further comprising a heater located within the cutout, wherein the heater is in thermal contact with a food bowl located within the cutout.

4. The refrigerated pet feeder of claim 1, further comprising:
   a heated plate located within the cutout, wherein the heated plate is in thermal contact with the hot side of the Peltier cooling element;
   an insulating element located between the cooled plate and the heated plate.

5. The refrigerated pet feeder of claim 1, wherein the cooled plate is made of aluminum.

6. The refrigerated pet feeder of claim 1, wherein the cooled plate is made of one of the following: copper, steel, stainless steel, thermally conductive polymers, ceramic.

7. The refrigerated pet feeder of claim 1, wherein the cooled plate is approximately 6 millimeters in thickness.

8. The refrigerated pet feeder of claim 1, wherein the cooled plate comprises a low-friction thermally conductive coating applied to a top side of the cooled plate.

9. The refrigerated pet feeder of claim 1, further comprising a heat sink thermally connected to the hot side of the Peltier heating element.

10. The refrigerated pet feeder of claim 1, wherein the cooling device is a fan.

11. The refrigerated pet feeder of claim 1, wherein the cooling device is a water-cooling system.

12. The refrigerated pet feeder of claim 1, wherein the cooling device cools the hot side of the Peltier heating element to approximately 30° C.

13. The refrigerated pet feeder of claim 1, wherein the temperature difference between the coldest and hottest points on the cooled plate is less than 10° C.

14. The refrigerated pet feeder of claim 1, wherein each one of the food bowls comprises a bottom, wherein the bottom of each food bowl is made of a thermally conductive material.

15. The refrigerated pet feeder of claim 1, further comprising thermally insulating material located between each two adjacent food bowls.

16. The refrigerated pet feeder of claim 1, wherein the tray comprises multiple bowls and an axis of rotation, wherein each one of the multiple bowls is connected to the axis of rotation using a pin.

17. The refrigerated pet feeder of claim 1, further comprising:
    a processor and memory;
    a communication interface.

18. The refrigerated pet feeder of claim 1, further comprising at least one digital scale placed in such a way as to measure the weight of at least one portion of food in at least one food bowl.

19. The refrigerated pet feeder of claim 1, further comprising:
    at least one depth sensor for measuring the volume of dispensed and consumed food.

20. The refrigerated pet feeder of claim 1, further comprising at least one of the following:
    an audible alert;
    a visible alert.

21. The refrigerated pet feeder of claim 20, wherein the visible alert is a blue light.

* * * * *